United States Patent [19]

Stalker et al.

[11] 4,169,020
[45] Sep. 25, 1979

[54] METHOD FOR MAKING AN IMPROVED GAS SEAL

[75] Inventors: Kenneth W. Stalker, Cincinnati; John W. Zelahy, West Chester; Norman P. Fairbanks, Cincinnati, all of Ohio

[73] Assignee: General Electric Company, Cincinnati, Ohio

[21] Appl. No.: 863,017

[22] Filed: Dec. 21, 1977

[51] Int. Cl.² .............................................. C25D 15/00
[52] U.S. Cl. .......................................... 204/16; 204/23
[58] Field of Search ............................. 204/16, 23, 25

[56] References Cited

U.S. PATENT DOCUMENTS

| | | | |
|---|---|---|---|
| 2,820,746 | 1/1958 | Keeleric | 209/16 |
| 3,199,836 | 8/1965 | Moyer | 415/212 R |
| 3,339,933 | 9/1967 | Foster | 77/753 |
| 3,957,593 | 5/1976 | Haack | 209/16 |

*Primary Examiner*—T. M. Tufariello
*Attorney, Agent, or Firm*—Lee H. Sachs; Derek P. Lawrence

[57] ABSTRACT

An improved gas seal between a stationary member and a movable member, one of which includes an abrasive tipped projection directed toward a surface of the other, for example a turbine engine blade and a cooperating shroud member, is provided through an improvement in the abrasive tip. Such improved tip of the projection is a composite of inner and outer tip portions, the inner portion comprising an alloy resistant to oxidation, sulfidation and thermal fatigue at operating temperatures and the outer tip portion comprising a matrix entrapping a plurality of abrasive particles which protrude from the matrix toward the surface of the other member. The inner tip portion is bonded with the metallic body of the projection and the outer tip portion is deposited on the inner tip portion.

4 Claims, 2 Drawing Figures

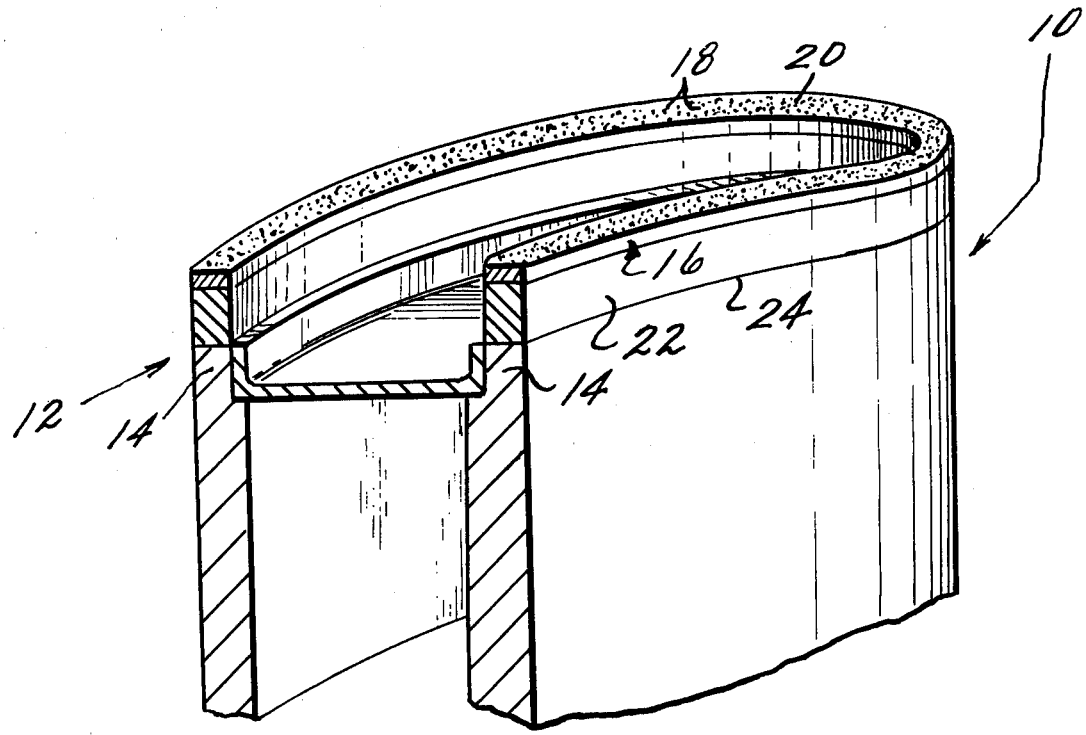

METHOD FOR MAKING AN IMPROVED GAS SEAL

FIELD OF THE INVENTION

This invention relates to gas seals between stationary and movable members, such as rotary seals in gas turbine engines and, more particularly, it relates to that type of gas seal between the tip of a turbine engine blade and a cooperating shroud member.

CROSS REFERENCES TO RELATED APPLICATIONS

This application relates to copending and concurrently filed applications Ser. No. 862,782, entitled "Improved Casting Alloy and Directionally Solidified Article"; Ser. No. 862,781, entitled "Turbomachinery Blade with Improved Tip Cap"; and Ser. No. 862,783, entitled "Improved Rotary Labyrinth Seal Member."

BACKGROUND OF THE INVENTION

The efficiency of a compressor and a turbine in axial flow turbine engines is dependent, at least in part, on whether or to what extent compressed air or expanding combustion products leak through a space between blades and cooperating shrouds or surfaces. There have been reported a variety of structures for reducing such leakage, sometimes referred to as interstage leakage. These have included the cooperation between an airfoil tip and a variety of materials which the tip can abrade in the event of interference between such cooperating members, with the object of reducing the gap between such cooperating members. It has been suggested, as described in U.S. Pat. No. 3,199,836—Moyer, issued Aug. 10, 1965, that abrasive particles be welded to a blade tip to enhance removal of interferring material. Other means of application of such abrasive particles include the thermal spraying of such particles as alumina. However, such methods of application and the tips themselves have resulted in the spalling of the applied material. Also, cracking of the blade tip can occur due to thermal fatigue during engine operation.

SUMMARY OF THE INVENTION

It is an object of the present invention to provide, in a gas seal arrangement, an improved member which includes a projection having a tip which is abrasive to a cooperating member and yet includes a portion resistant to oxidation, sulfidation and thermal fatigue.

It is another object to provide such a tip on a turbine engine blade which cooperates with a stationary, opposing surface.

Still another object is to provide an improved method for applying abrasive particles to such a projection whereby the particles protrude from the tip.

These and other objects and advantages will be more fully understood from the drawing and from the following detailed description and examples, all of which are intended to be representative of rather than in any way limiting on the scope of the present invention.

Briefly, a gas seal including a stationary member and a rotating member positioned to define the gas seal therebetween, one of the members including an abrasive tipped projection directed toward the other member, is improved in one form of the present invention through improvement of the projection tip. Such tip is a composite of inner and outer tip portions, the inner tip portion comprising an alloy resistant to oxidation, sulfidation and thermal fatigue at operating temperatures, in a shape bonded to the body of the projection. The outer tip portion comprises a metal matrix entrapping a plurality of protruding abrasive particles.

In one form of the method associated with the present invention, the outer tip portion is produced by electrodepositing the metal matrix while, concurrently, entrapping the abrasive particles which are included in the electroplating solution. In another form, the inner tip portion is first diffusion bonded to the projection body prior to such application of the outer tip portion.

DESCRIPTION OF THE PREFERRED EMBODIMENTS

Figure 1:
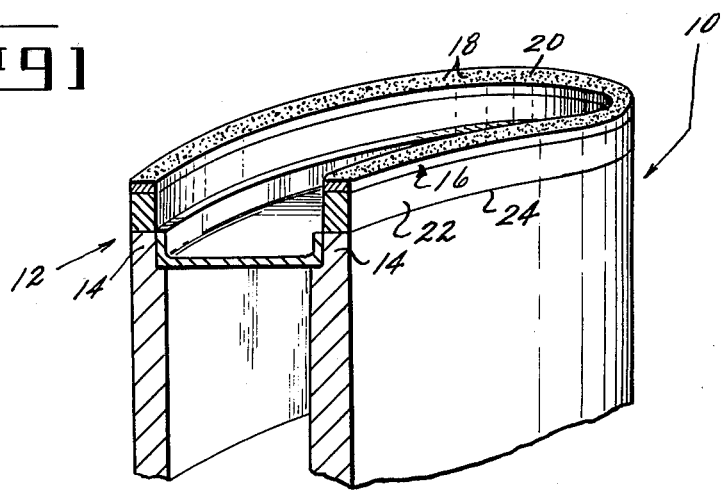
FIG. 1 is a fragmentary, perspective sectional view of an airfoil-shaped turbomachinery blade.

Although the problem of interstage leakage is important both in the compressor as well as in the turbine of axially flow turbine engines, the problem is more critical in the turbine section because of the high temperatures experienced. The gas turbine engine art describes a wide variety of turbine blade tips which are designed to include reduced cross-sectional thickness projections, sometimes called "squealer" tips. One form of such a tip is shown in U.S. Pat. No. 3,899,267, issued Aug. 12, 1975, the disclosure of which is incorporated herein by reference. This and other types of turbine blade tips generally are coated for oxidation and corrosion protection. However, if the blade tip should rub a cooperating surface, such as a shroud, that protective coating is removed from the blade tip exposing the blade material to oxidation and corrosion environment.

One form of the present invention provides an improved blade tip including a matrix which entraps abrasive particles, allowing particles to protrude from the matrix because the thickness of the matrix is less than the longest dimension of such protruding particles. In addition, one form of the present invention provides such a blade tip with an inner portion of an alloy resistant to oxidation, sulfidation and thermal fatigue, preferably in the monocrystal or directionally oriented elongated multi-grained cast condition.

The invention will be more clearly understood by reference to the drawing taken with the accompanying description of such embodiments, all of which are intended to be typical of rather than limiting on the scope of the appended claims.

Figure 2:
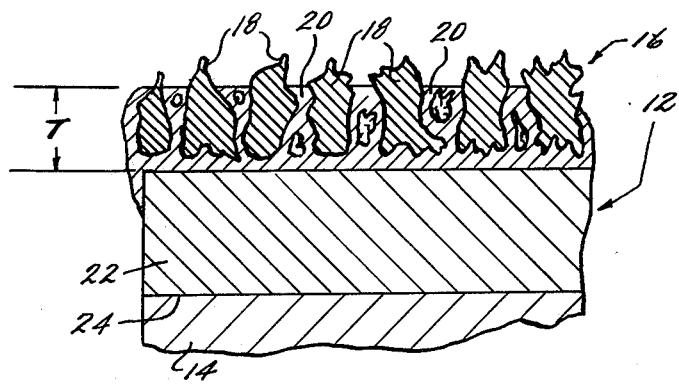
FIG. 2 is an enlarged, sectional, diagrammatic view of the blade tip in FIG. 1.

FIG. 1 of the drawing is a fragmentary, perspective, sectional view of an airfoil-shaped turbomachinery blade including a blade body shown generally at 10 and including a tip projection shown generally at 12 in the form of an airfoil-shaped squealer tip extending radially outwardly from the blade body. FIG. 2 is an enlarged, sectional, diagrammatic view of projection 12. Airfoil-shaped metallic projection body 14, which extends about the periphery of the blade body, includes an outer tip portion 16 comprised of a plurality of abrasive particles 18 entrapped in a metal matrix 20. The radial thickness T of the matrix, as shown in FIG. 2, is less than the longest dimension of the abrasive particles in the direction of their protrusion from the matrix so that the matrix does not completely encapsulate all such particles.

Disposed between outer tip portion 16 and projection body 14 is an inner tip portion 22 in the form of a shaped member which is discrete from, i.e. originally not a part of the projection body, and of an alloy resistant to oxidation, sulfidation and thermal fatigue at turbine operating temperatures for example, an alloy based on one or more of the elements Fe, Co and Ni. Inner tip portion 22 is diffusion bonded at joint 24 with projection body 14. It is preferable to provide inner tip portion 22 in the form of a monocrystal or elongated grained cast member, provided by directional solidification casting, for example to the cross-sectional configuration of projection body 14 in the area of diffusion bonded joint 24. There are a variety of monocrystal and directional solidification casting methods and apparatus widely reported in the art, for example U.S. Pat. No. 3,897,815, issued Aug. 5, 1975, which can be used in the provision of inner tip portion 22. The inner portion 22 can be bonded to projection body 14 by a variety of methods, one of which is the type of diffusion bonding described in U.S. Pat. No. 3,632,319, issued Jan. 4, 1972, using such bonding materials as are described in U.S. Pat. Nos. 3,700,427 and 3,759,692, issued Oct. 24, 1972 and Sept. 18, 1973, respectively. The disclosure of each of these four patents is incorporated herein by reference.

Thus, there is provided an improved tip of a projection which can be an airfoil-shaped part of a turbine engine blading member or another type of projection which cooperates in a gas seal between a stationary member and a movable member. Such an improved tip in one form is provided not only with abrasive characteristics but also with an inner tip portion of an alloy resistant to oxidation, sulfidation and thermal fatigue at elevated temperatures to avoid tip cracking of the projection.

In the manufacture of the improved projection associated with the present invention, the outer tip portion can be applied in a variety of ways provided the matrix 20 is limited to a thickness less than that which will prevent protrusion of abrasive particles 18 from the surface of outer tip portion 16 as shown in FIG. 2. It has been found desirable to deposit abrasive particles 18 and metal matrix 20 concurrently on inner tip portion 22 after the inner portion has been bonded to projection body 14. This codeposition of matrix and particles was accomplished electrolytically from an electrodeposition bath in which are suspended abrasive particles 18, for example of aluminum oxide, cubic boron nitride, or various other abrasive carbides, oxides, silicides, or nitrides, stable at intended operating temperatures. Such deposition is well known and used commercially in the manufacture of metal-bonded, abrasive metal removal tools such as grinding wheels and cutting tools.

In one example, a projection, typical of a gas turbine engine blade having a tip of the general configuration shown in FIG. 1 was made of a nickel-base superalloy having the approximate composition, by weight, of 0.1% C, 9% Cr, 7–8% (Al+Ti), 0.015% B, 8–10% (Mo+W), 10% Co, 4% Ta, 1.5% Hf, 0.05% Zr with the balance Ni and incidental impurities. Such projection body was provided with the improved projection tip according to the present invention. An inner tip portion was made from an alloy consisting nominally, by weight, of 33% Ni, 33% Co, 23% Cr, 3% Ta, 4% Al, 3% W, 0.5% C and 0.75% Si along with incidental impurities, more particularly described in the above-identified cross-referenced application Ser. No. 862,782, entitled "Improved Casting Alloy and Directionally Solidified Article," filed concurrently with this application. Such inner tip portion was cast as a single crystal in accordance with the method described in the above-incorporated U.S. Pat. No. 3,897,815. After shaping the inner tip portion substantially to the cross-sectional configuration of the projection body, the inner tip monocrystal alloy structure was diffusion bonded to the projection body as described above in connection with the above-incorporated patents. An outer tip portion then can be applied to the inner tip portion by first applying an electrolytic layer of nickel followed by concurrent application of the abrasive particles and nickel from an electrolytic bath in the same manner as is used in the commercial manufacture of metal-bonded grinding wheels. Thereafter, alternating layers of chromium and nickel can be electrodeposited about the protruding abrasive particles until a matrix of alternating layers of Ni and Cr are generated to a thickness less than the thickness of the abrasive particles protruding outwardly from the inner tip portion. Then the outer tip portion can be subjected to aluminiding in accordance with the method described in U.S. Pat. No. 3,667,985, the disclosure of which is incorporated herein by reference. Thus, there can be created as a matrix an alloy of Ni, Cr and Al typical of the MCrAl type alloys, wherein M can be Fe, Co, Ni or their combinations, widely described in the art in connection with the coating of high temperature articles such as gas turbine engine turbine blades. Such an abrasive outer tip portion 16 has been applied in this manner to the tips of production design gas turbine engine turbine blades of an alloy sometimes referred to as Rene' 80 alloy, more particularly described in U.S. Pat. No. 3,615,376, and successfully tested in an engine.

Although in the above examples the projection body and the inner tip portion both were based on nickel, it should be understood that a variety of high temperature superalloy-type alloys provided with the characteristics of oxidation, sulfidation and thermal fatigue resistance can be used. For example, a cobalt-base alloy, sometimes referred to as HS188 alloy and having a nominal composition, by weight, of 22% Cr, 22% Ni, 14.5% W, 0.1% C, 0.1% La with the balance essentially Co has been used as an inner tip portion and tested in a gas turbine engine. The selection of such a material depends on the desired physical and mechanical properties for the intended application.

Although the present invention has been described in connection with specific examples, it will be recognized by those skilled in the art the variations and modifications of which the present invention is capable. It is intended to include within the scope of the appended claims all such variations and modifications.

What is claimed is:

1. In a method for making a member of a gas seal, the member including a projection having a metallic body and an abrasive outer tip, the steps of:

provingdiscreet inner tip portion of an alloy resistant to the combination of oxidation, sulfidation and thermal fatigue;

diffusion bonding the inner tip portion to the projection body;

applying an outer tip portion to the inner tip portion by electrodepositing thereon a matrix based on an element selected from the group consisting of Cr, Co, Ni and alloys based on Cr, Co or Ni while entrapping in the matrix a plurality of abrasive particles, the matrix being deposited to a thickness less than the longest dimension of the abrasive particles generally in the direction of protrusion axially from the projection so that the abrasive particles protrude from the matrix.

2. In the method of claim 1, for making a turbomachinery blade, the steps of:

providing a turbomachinery blade including a blade body and a metallic blade projection about the radial outer periphery of the blade body;

providing a discreet inner tip portion of an alloy resistant to the combination of oxidation, sulfidation and thermal fatigue;

diffusion bonding the inner tip portion to the projection; and then, applying an outer tip portion to the inner tip portion by electrodepositing thereon a matrix based on an element selected from the group consisting of Cr, Co, Ni and alloys based on Cr, Co or Ni while entrapping in the matrix a plurality of abrasive particles, the matrix being deposited to a thickness less than the longest dimension of the abrasive particles generally in the direction of protrusion axially from the projection so that the abrasive particles protrude from the matrix.

3. The method of claim 2 in which:

the alloy of the inner tip portion is based on an element selected from the group consisting of Fe, Co and Ni, and the inner tip portion is a discrete casting having a directionally oriented structure.

4. The method of claim 3 in which the inner tip portion is a single crystal.

* * * * *